(12) United States Patent
Takeshita et al.

(10) Patent No.: US 12,718,110 B2
(45) Date of Patent: Aug. 25, 2026

(54) LEARNING DEVICE, LEARNING METHOD, AND LEARNING PROGRAM

(71) Applicant: Hitachi, Ltd., Tokyo (JP)

(72) Inventors: Koki Takeshita, Tokyo (JP); Naoyuki Terashita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 613 days.

(21) Appl. No.: 18/222,500

(22) Filed: Jul. 17, 2023

(65) Prior Publication Data

US 2024/0070468 A1 Feb. 29, 2024

(30) Foreign Application Priority Data

Aug. 25, 2022 (JP) ................................ 2022-134260

(51) Int. Cl.
*G06N 3/096* (2023.01)
*G06N 3/0464* (2023.01)

(52) U.S. Cl.
CPC ........... *G06N 3/096* (2023.01); *G06N 3/0464* (2023.01)

(58) Field of Classification Search
CPC ............................ G06N 3/096; G06N 3/0464
See application file for complete search history.

(56) References Cited

U.S. PATENT DOCUMENTS 12,020,133 B2 * 6/2024 Goldszmidt ........ G06F 18/2415
2020/0234189 A1 * 7/2020 Oda ...................... G06N 5/025
2020/0250544 A1 * 8/2020 Katoh .................... G06N 3/045
2021/0390355 A1 * 12/2021 Xu ...................... G06F 18/2411
2022/0138495 A1 * 5/2022 Xu ...................... G06N 3/0464 382/157
2022/0383622 A1 * 12/2022 Nakai .................. G06V 10/778
2023/0087526 A1 * 3/2023 Huang ................. G06V 10/774 382/156
2024/0086765 A1 * 3/2024 Lee ....................... G06N 3/045

FOREIGN PATENT DOCUMENTS

JP 2020-115288 A 7/2020

OTHER PUBLICATIONS

Wan, Xiong-bo et al., Bearing Fault Diagnosis Method, Device And Medium Based On Dynamic Domain Adaptive Network, CN 120105186 A, English translation, filed Feb. 8, 2025 (Year: 2025).*

* cited by examiner

*Primary Examiner* — Barbara M Level
(74) *Attorney, Agent, or Firm* — MATTINGLY & MALUR, PC

(57) ABSTRACT

Transfer learning for a target domain that partially matches classification of a source domain having a ground truth is enabled. A learning device stores a first set subjected to classification and assigned with a ground truth and a second set having a class that partially matches the first set, and executes, based on a first loss function of first data and a second loss function of second data, processing of updating, by the number of updates, an identifier for identifying the first data and the second data when a feature of the first data or a feature of the second data is input. The learning device calculates a similarity at which the first data is similar to the second data by a data selector that calculates the similarity at the last time, and updates the data selector and the first distribution based on the estimated value.

9 Claims, 9 Drawing Sheets

FIG. 2

BEFORE LEARNING $p_s$ $p_t$

FEATURE SPACE

○ : SOURCE DATA IN $p_s$

● : TARGET DATA IN $p_t$

AFTER LEARNING $p_s$ $p_t$

FEATURE SPACE

FIG. 3 k=0

Figure 3:
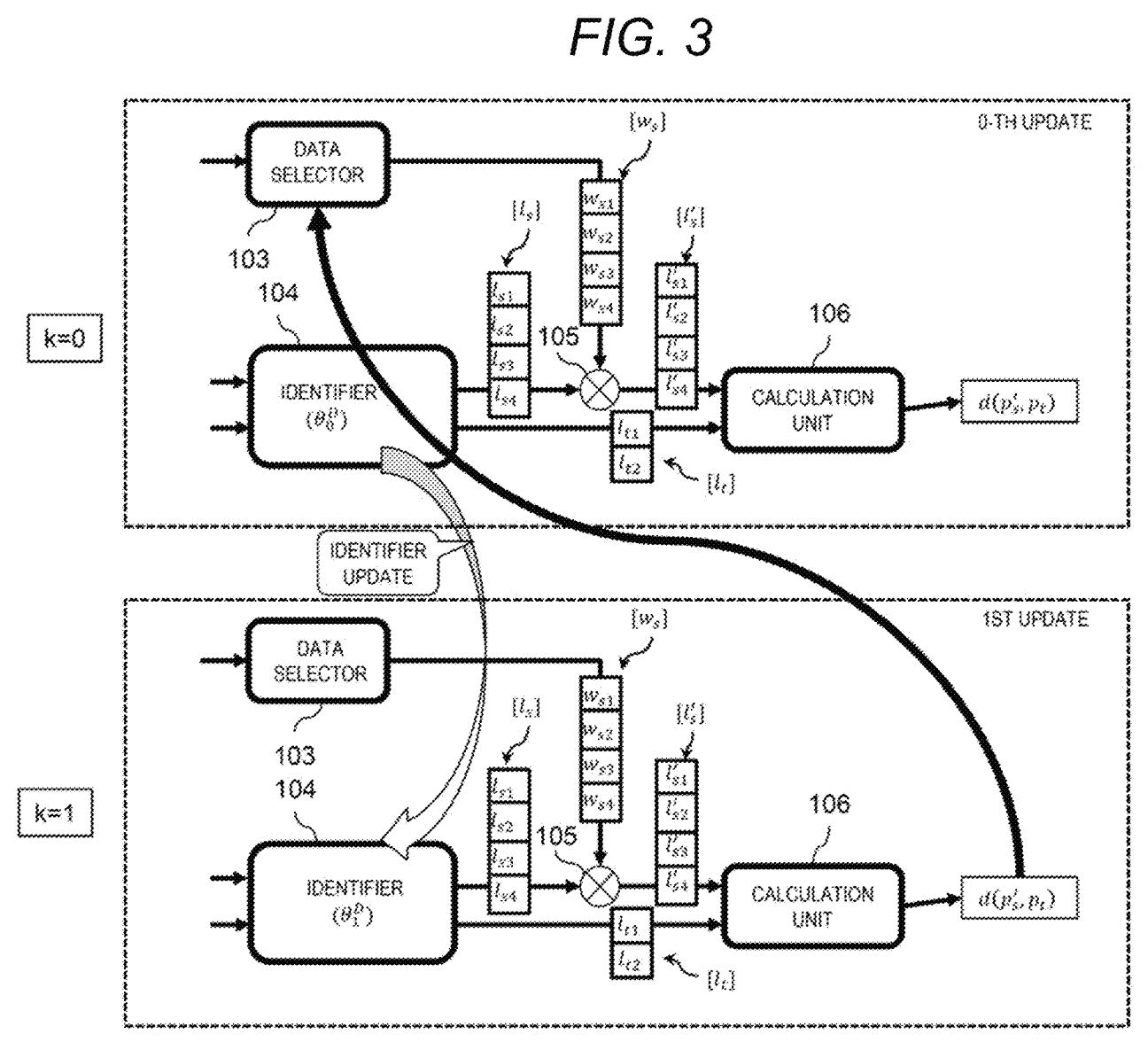

0-TH UPDATE

DATA SELECTOR

103

104

IDENTIFIER

105

106

CALCULATION UNIT

IDENTIFIER UPDATE k=1

1ST UPDATE

DATA SELECTOR

103

104

IDENTIFIER

105

106

CALCULATION UNIT

0-TH UPDATE
103
DATA SELECTOR
106
CALCULATION UNIT
IDENTIFIER ($\theta_0^D$)
104
$d(p_S', p_t)$
IDENTIFIER UPDATE
1ST UPDATE
106
CALCULATION UNIT
DATA SELECTOR
IDENTIFIER ($\theta_1^D$)
103
104
$d(p_S', p_t)$
IDENTIFIER UPDATE
2ND UPDATE
103
106
CALCULATION UNIT
DATA SELECTOR
IDENTIFIER ($\theta_2^D$)
103
104
$d(p_S', p_t)$ 100
706
701
PROCESSOR
702
STORAGE DEVICE
703
INPUT DEVICE
704
OUTPUT DEVICE
705
COMMUNI-CATION IF

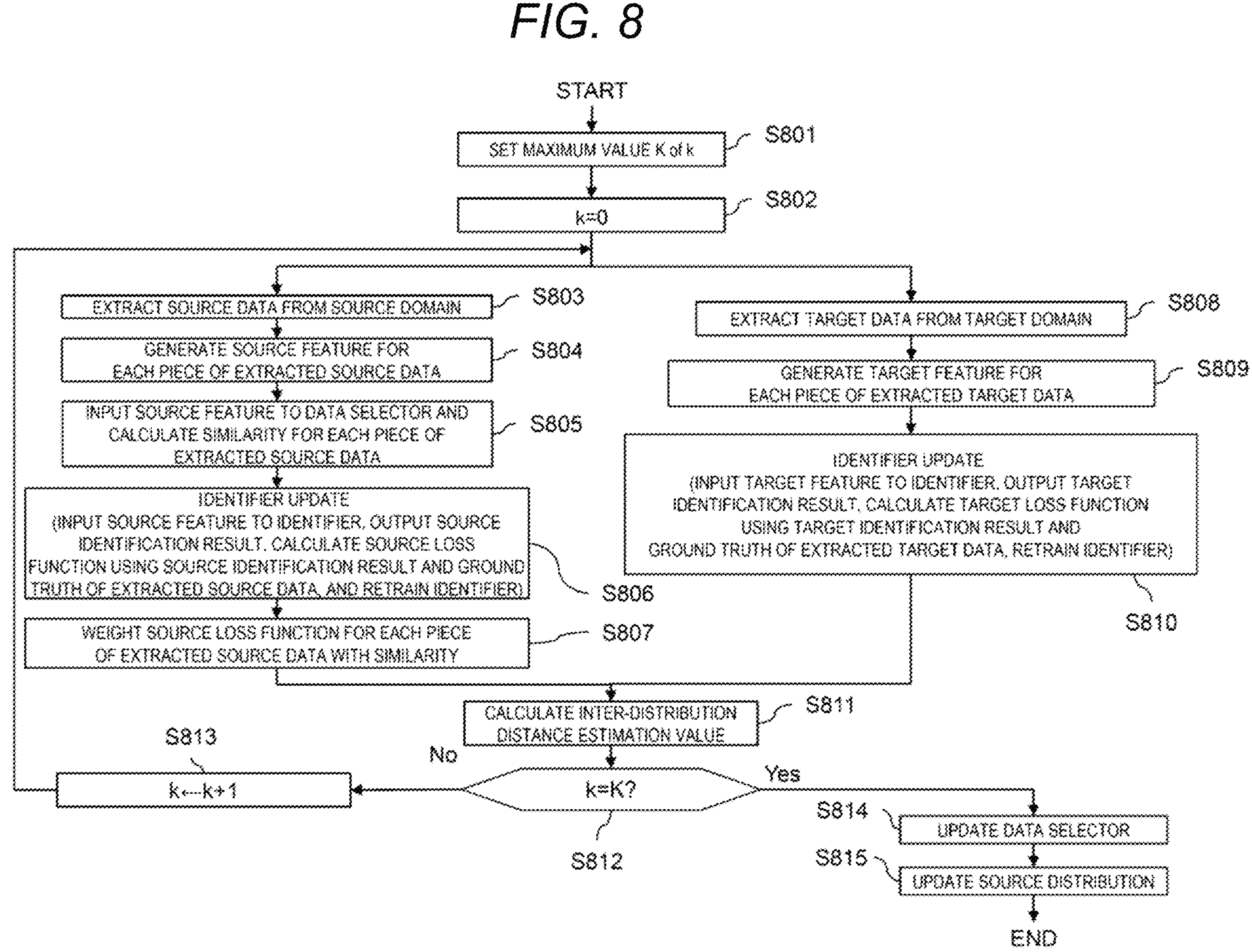
FIG. 8
START
SET MAXIMUM VALUE K of k
S801
k=0
S802
EXTRACT SOURCE DATA FROM SOURCE DOMAIN
S803
GENERATE SOURCE FEATURE FOR EACH PIECE OF EXTRACTED SOURCE DATA
S804
INPUT SOURCE FEATURE TO DATA SELECTOR AND CALCULATE SIMILARITY FOR EACH PIECE OF EXTRACTED SOURCE DATA
S805
IDENTIFIER UPDATE (INPUT SOURCE FEATURE TO IDENTIFIER, OUTPUT SOURCE IDENTIFICATION RESULT, CALCULATE SOURCE LOSS FUNCTION USING SOURCE IDENTIFICATION RESULT AND GROUND TRUTH OF EXTRACTED SOURCE DATA, AND RETRAIN IDENTIFIER)
S806
WEIGHT SOURCE LOSS FUNCTION FOR EACH PIECE OF EXTRACTED SOURCE DATA WITH SIMILARITY
S807
EXTRACT TARGET DATA FROM TARGET DOMAIN
S808
GENERATE TARGET FEATURE FOR EACH PIECE OF EXTRACTED TARGET DATA
S809
IDENTIFIER UPDATE (INPUT TARGET FEATURE TO IDENTIFIER, OUTPUT TARGET IDENTIFICATION RESULT, CALCULATE TARGET LOSS FUNCTION USING TARGET IDENTIFICATION RESULT AND GROUND TRUTH OF EXTRACTED TARGET DATA, RETRAIN IDENTIFIER)
S810
CALCULATE INTER-DISTRIBUTION DISTANCE ESTIMATION VALUE
S811
S813
No
k=K?
Yes
k←k+1
S812
S814
UPDATE DATA SELECTOR
S815
UPDATE SOURCE DISTRIBUTION
END

LEARNING DEVICE, LEARNING METHOD, AND LEARNING PROGRAM

CROSS-REFERENCE TO RELATED APPLICATION

The present application claims priority from Japanese patent application No. 2022-134260 filed on Aug. 25, 2022, the content of which is hereby incorporated by reference into this application.

BACKGROUND OF THE INVENTION

1. Field of the Invention

The present invention relates to a learning device that executes transfer learning, a learning method, and a learning program.

2. Description of Related Art

Artificial intelligence (AI) using deep learning often uses a learning method referred to as transfer learning. The transfer learning is a learning method in which, when sufficient training data is not obtained, pre-learning is performed with a data set similar to a target task, and then the target task is learned. In the transfer learning, a situation in which a ground truth of a data set used for preliminary learning does not partially match a ground truth of a data set of the target task often happens in reality.

PTL 1 below discloses a transfer learning method for extracting transfer data. In this transfer learning method, a computer acquires training data of a transfer destination input to a learning device of the transfer destination so as to identify a first label and a third label, acquires training data of a transfer source input to a learning device of the transfer source so as to identify the first label and a second label when a difference between the number of pieces of data of the third label among the training data of the transfer destination and the number of pieces of training data of the first label among the training data of the transfer destination is larger than a preset number, extracts training data satisfying a specified constraint from the same training data indicating the first label of the transfer destination and the transfer source from the acquired training data of the transfer source, and performs learning based on the extracted training data and the training data of the transfer destination.

CITATION LIST

Patent Literature

PTL 1: JP2020-115288A

SUMMARY OF THE INVENTION

However, in PTL 1 described above, a condition is not provided for the difference between the number of pieces of data of the third label of the training data and the number of pieces of data of the first label of the transfer destination.

An object of the invention is to enable transfer learning for a target domain that partially matches classification of a source domain having a ground truth.

A learning device according to one aspect of the invention disclosed in the present application is a learning device including a processor configured to execute a program and a storage device configured to store the program. The storage device stores a first set in which a ground truth corresponding to one of a plurality of classes is assigned to each of a plurality of pieces of first data classified into the plurality of classes, and a second set having a plurality of pieces of second data subjected to classification into a smaller number of classes than the plurality of classes. The processor executes identification processing of updating, when one of a feature of the first data and a feature of the second data is input, an identifier for identifying whether the data whose feature is input is the first data or the second data, based on a first loss function obtained as a result of the input of the feature of the first data and a second loss function obtained as a result of the input of the feature of the second data, by the number of updates, data selection processing of calculating a similarity by a data selector that calculates the similarity, the similarity indicating how much the first data is similar to the second data when the feature of the first data is input at a last time of the number of updates, adjustment processing of adjusting the first loss function obtained at the last time using the similarity calculated by the data selection processing, calculation processing of calculating an estimated value of an inter-distribution distance between a first distribution of the plurality of pieces of first data and a second distribution of the plurality of pieces of second data based on the first loss function after the adjustment performed by the adjustment processing and the second loss function, data selector update processing of updating the data selector based on the estimated value calculated by the calculation processing, and distribution update processing of updating the first distribution based on the estimated value.

According to a representative embodiment of the invention, it is possible to enable transfer learning for the target domain that partially matches the classification of the source domain having the ground truth. Problems, configurations, and effects other than those described above are made clear by the following description of embodiments.

BRIEF DESCRIPTION OF THE DRAWINGS

FIG. 2 is a diagram showing an inter-distribution distance estimation value before and after learning;

FIG. 3 is a diagram showing a learning example 1 executed by the learning device;

FIG. 8 is a flowchart showing an example of a learning processing procedure executed by the learning device.

DESCRIPTION OF EMBODIMENTS

Functional Configuration Example of Learning Device

Figure 1:
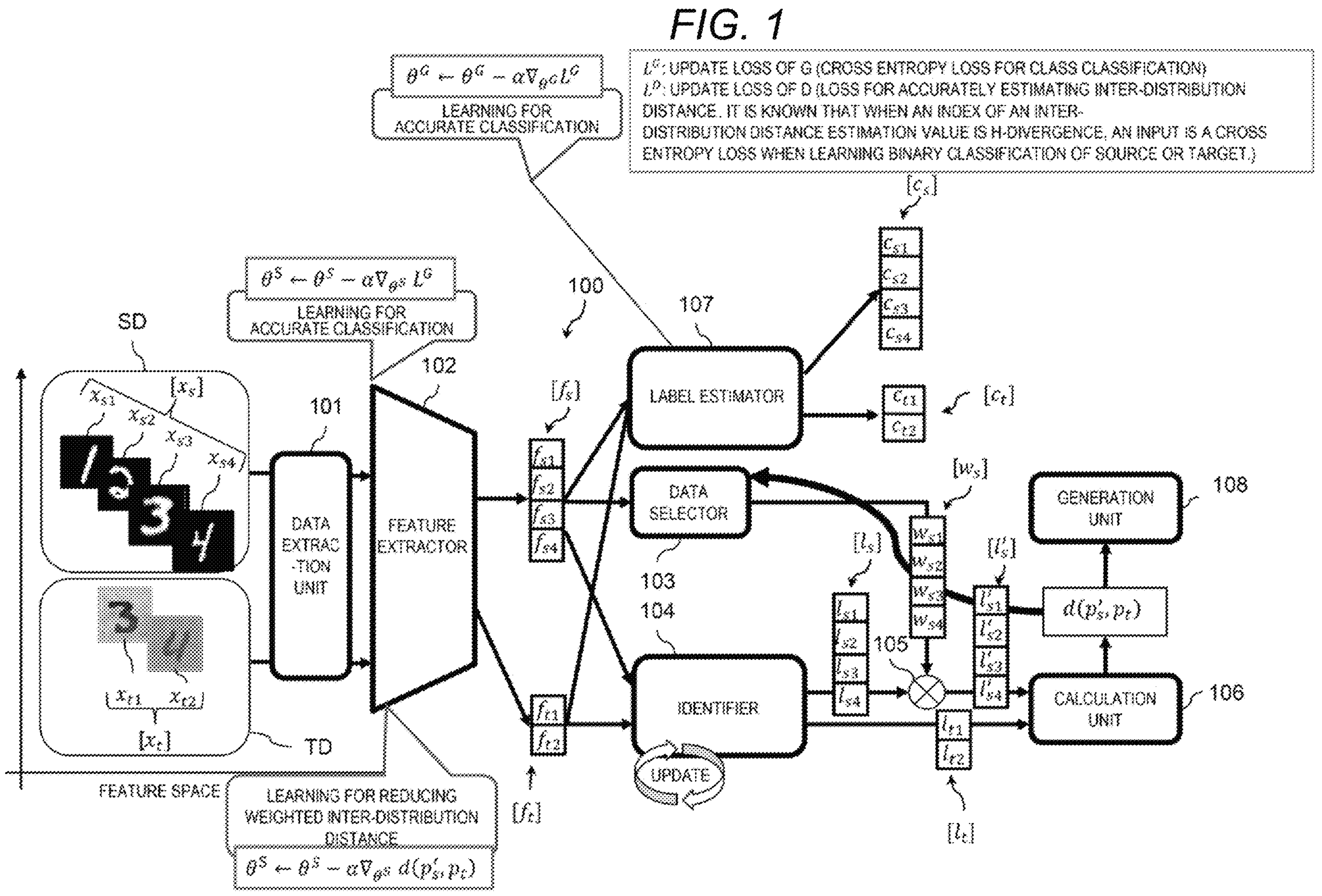
FIG. 1 is a block diagram showing a functional configuration example of a learning device.

FIG. 1 is a block diagram showing a functional configuration example of a learning device. A learning device 100 includes a data extraction unit 101, a feature extractor 102, a data selector 103, an identifier 104, an adjustment unit 105, a calculation unit 106, a label estimator 107, a generation unit 108, and a storage unit 110.

The storage unit 110 stores a source domain SD, which is a first data set group of a transfer source, and a target domain TD, which is a second data group of a transfer destination.

The data extraction unit 101 extracts data from each of the source domain SD and the target domain TD. Each piece of data in the source domain SD is assigned with a ground truth, and each piece of data in the target domain TD is subjected to classification, but no ground truth is assigned thereto. In FIG. 1, as an example, each piece of data of the source domain SD is assumed to be image data in which numerals "1" to "4" are handwritten. The ground truths of an image data group are numerals "1" to "4". Further, it is assumed that each piece of data of the target domain TD is image data in which the numbers "3" and "4" are handwritten. No ground truth is assigned to the image data group.

In this example, it is assumed that the data extraction unit 101 extracts pieces of source data xs1 to xs4 from the source domain SD as a source data group [xs], and extracts pieces of target data xt1 and xt2 from the target domain TD as a target data group [xt]. When the pieces of source data xs1 to xs4, and the like in the source domain SD are not distinguished from one another, these pieces of source data xs1 to xs4, and the like are simply referred to as source data xs. In addition, when the pieces of target data xt1, xt2, and the like in the target domain TD are not distinguished from one another, these pieces of target data xt1, xt2, and the like are simply referred to as target data xt.

The feature extractor 102 is, for example, a convolutional neural network, and is a machine learning model that generates a feature of data input to the feature extractor 102. For example, when the pieces of source data xs1 to xs4 are input, the feature extractor 102 generates source features fs1 to fs4 as a source feature group [fs] for the source data group [xs]. Similarly, when the pieces of target data xt1 and xt2 are input, the feature extractor 102 generates target features ft1 and ft2 as a target feature group [ft] for the target data group [xt].

When the source features fs1 to fs4, and the like are not distinguished from one another, these source features fs1 to fs4, and the like are simply referred to as source feature fs. In addition, when the target features ft1, ft2, and the like are not distinguished from one another, these target features ft1, ft2, and the like are simply referred to as target feature ft.

The feature extractor 102 executes two types of learning. One type of learning is for improving classification accuracy of input data. When a learning parameter of the feature extractor 102 is denoted by $\theta^F$, the learning parameter $\theta^F$ is updated by the following Formula (1).

$$\theta^F \leftarrow \theta^F - \alpha\nabla_{\theta^F} L^G \tag{1}$$

In the above Formula (1), $\alpha$ is a constant. $L^G$ is an update loss of the label estimator 107. In the case of this example, due to the classification, the update loss $L^G$ is a cross entropy loss.

The other type of learning is learning in which an inter-distribution distance estimation value d(p's, pt) is reduced when a source loss function ls is weighted by importance v output by the data selector 103. In this learning, the learning parameter $\theta^F$ is updated by the following Formula (2).

$$\theta^F \leftarrow \theta^F - \alpha\nabla_{\theta^F} d(p'_s, p_t) \tag{2}$$

The inter-distribution distance estimation value d(p's, pt) is an estimated value of an inter-distribution distance between a distribution p's when a distribution ps of the source data xs is changed to the distribution p's and a distribution pt of the target data xt. The inter-distribution distance estimation value d(p's, pt) is, for example, a Wasserstein divergence or an H-Divergence.

The identifier 104 is a machine learning model that identifies whether data input to the identifier 104 is the source data xs or the target data xt and outputs an identification result. The identifier 104 calculates a loss function based on the identification result of the input data and the ground truth of the input data, performs relearning by using the loss function, and updates the identifier 104.

For example, when the source features fs1 to fs4 are input, the identifier 104 calculates source loss functions ls1 to ls4 as a source loss function group [ls] for the source feature group [fs]. Similarly, when the target features ft1 and ft2 are input, the identifier 104 calculates target loss functions lt1 and lt2 as a target loss function group [lt] for the target feature group [ft].

When the source loss functions ls1 to ls4, and the like are not distinguished from one another, the source loss functions ls1 to ls4, and the like are simply referred to as the source loss function ls. In addition, when the target loss functions ft1, ft2, and the like are not distinguished from one another, the target loss functions ft1, ft2, and the like are simply referred to as a target loss function lt. When the source loss function ls and the target loss function lt are not distinguished from each other, the source loss function ls and the target loss function lt are simply referred to as a loss function l. In this example, it is assumed that as a value of the loss function l is larger, identification accuracy of the identifier 104 is better.

The data selector 103 is a machine learning model that selects the source data xs which is similar to the target data xt by machine learning. Specifically, for example, the data selector 103 calculates similarities ws1 to ws4 as indexes indicating how much the pieces of source data xs1 to xs4 are similar to the pieces of target data xt1 and xt2. When the similarities ws1 to ws4, and the like are not distinguished from one another, the similarities ws1 to ws4, and the like are simply referred to as a similarity ws. It is assumed that as a value of the similarity ws is larger, the source data xs is more similar to the target data xt.

More specifically, for example, the data selector 103 inputs the source feature fs1 of the source data xs1 to the data selector 103, calculates a similarity between the source data xs1 and the target data xt1 and a similarity between the source data xs1 and the target data xt2, and sets a larger value of the similarities as the similarity ws1. The same applies to the pieces of source data xs2 to xs4, the source features fs2 to fs4 are respectively input to the data selector 103, similarities to the pieces of target data xt1 and xt2 are calculated for each of the source features fs2 to fs4, and respective larger values of the similarities are set as the similarities ws2 to ws4.

The data selector 103 performs the relearning using the inter-distribution distance estimation value d(p's, pt) by machine learning.

The adjustment unit 105 weights the source loss function group [ls] with a similarity group [ws], and outputs a weighted source loss function group [l's]. Specifically, for example, the adjustment unit 105 weights the source loss function ls1 with the similarity ws1, and outputs a weighted source loss function l's1. The same applies to the source loss functions ls2 to ls4, the adjustment unit 105 weights the source loss functions ls2 to ls4 with the similarities ws2 to ws4, and outputs weighted source loss functions l's2 to l's4. When the source loss functions l's1 to l's4, and the like are not distinguished from one another, the source loss functions l's1 to l's4, and the like are simply referred to as the source loss function l's.

The calculation unit 106 calculates the inter-distribution distance estimation value d(p's, pt). As described above, the inter-distribution distance estimation value d(p's, pt) is the estimated value of the inter-distribution distance between the distribution p's when the distribution ps is changed to the distribution p's and the distribution pt. The inter-distribution distance estimation value d(p's, pt) is, for example, the Wasserstein divergence or the H-Divergence.

Specifically, for example, the calculation unit 106 substitutes the source loss function l's and the target loss function lt as parameters into a function for calculating the Wasserstein divergence or the H-Divergence, and calculates the inter-distribution distance estimation value d(p's, pt).

The label estimator 107 estimates a ground truth for classifying input data. Specifically, for example, when the source features fs1 to fs4 of the source feature group [fs] obtained from the source domain SD are input, the label estimator 107 estimates the ground truths of the pieces of source data xs1 to xs4, and outputs estimation results cs1 to cs4, as an estimation result group [cs], from the label estimator 107. The label estimator 107 performs learning based on a difference between the ground truths of the pieces of source data xs1 to xs4 and the estimation results cs1 to cs4. When a learning parameter of the label estimator 107 is denoted by $\theta^G$, the learning parameter $\theta^G$ is updated by the following Formula (3).

$$\theta^G \leftarrow \theta^G - \alpha\nabla_{\theta^G} L^G \tag{3}$$

When the target features ft1 and ft2 of the target feature group [ft] obtained from the target domain TD are input, the label estimator 107 estimates the ground truths of the pieces of target data xt1 and xt2, and outputs estimation results ct1 and ct2, as an estimation result group [ct], from the label estimator 107.

The generation unit 108 generates, for example, a graph (described later in FIG. 6) indicating a change as information indicating a change in the inter-distribution distance estimation value d(p's, pt) associated with an increase or decrease in the number of updates k of the identifier 104. The generation unit 108 updates the distribution ps to the distribution p's, so that an inter-distribution distance from the distribution pt becomes the inter-distribution distance estimation value d(p's, pt). Specifically, for example, the generation unit 108 updates the feature of the source data xs in the distribution ps, so that a distance between an average of the features of the source data xs in the distribution p's and an average of the features of the target data xt in the distribution pt becomes the inter-distribution distance estimation value d(p's, pt).

Figure 2:
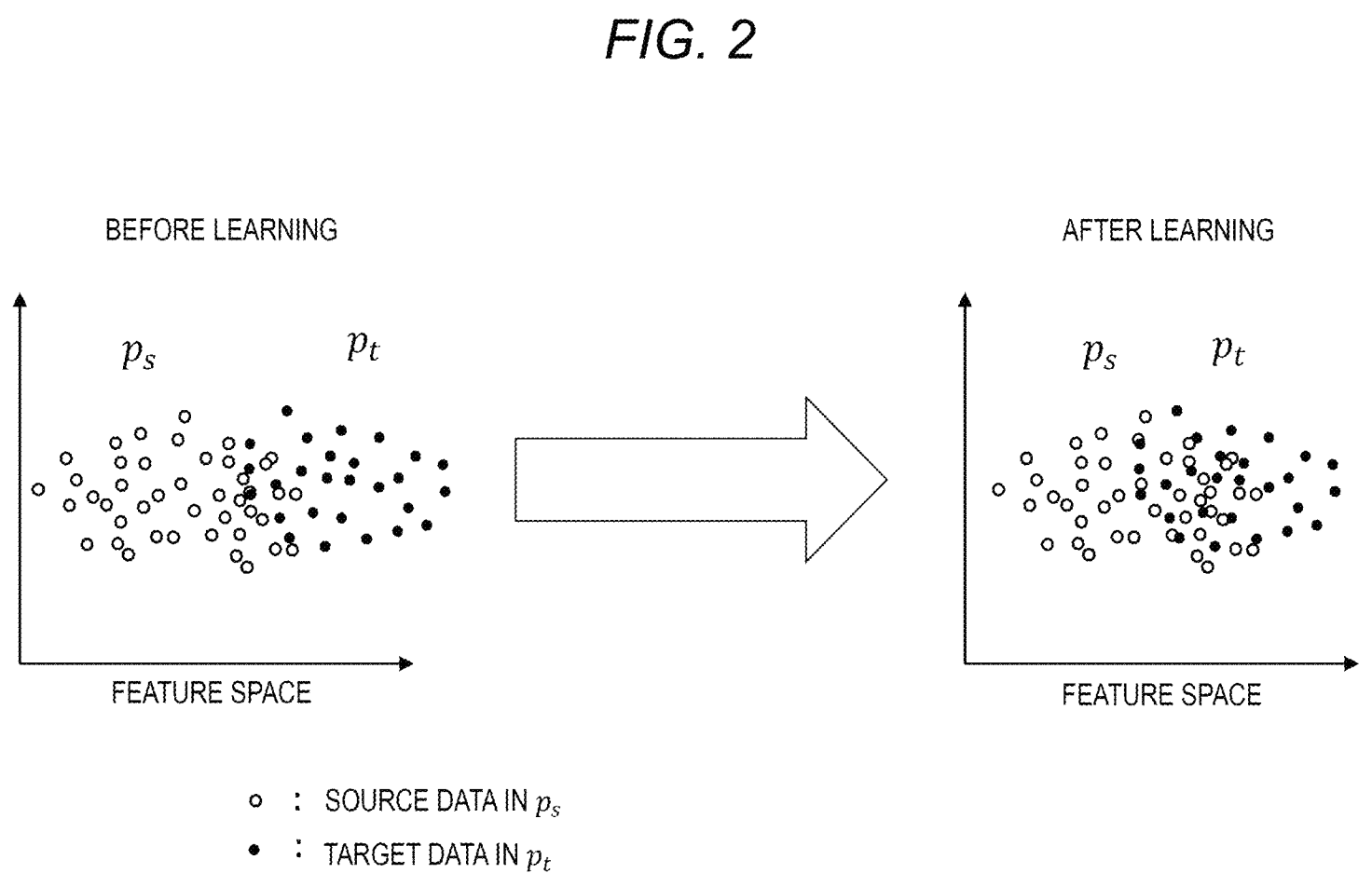

FIG. 2 is a diagram showing an inter-distribution distance estimation value before and after learning. The generation unit 108 updates the distribution ps to the distribution p's, so that the inter-distribution distance from the distribution pt becomes the inter-distribution distance estimation value d(p's, pt). Accordingly, the label estimator 107 can estimate the ground truth of the target data xt in the distribution pt, and label estimation accuracy is improved. Next, a content of transfer learning in the learning device 100 will be described.

Transfer Learning

Unsupervised Domain Adaptation

A task for learning the classification of the target domain TD under a condition that there are two different distributions ps and pt, which are the source domain SD and the target domain TD, and that the ground truth is assigned only to the source data xs in the source domain SD is referred to as an unsupervised domain adaptation (hereinafter, UDA). The UDA includes the above-described feature extractor 102, the identifier 104, the label estimator 107, and the calculation unit 106.

In the UDA, since the ground truth of the classification is not assigned to the target data xt in the target domain TD, the classification for the target domain TD cannot be learned directly. Therefore, the UDA optimizes the feature extractor 102 by simultaneously learning the following two tasks T1 and T2, so that the label estimator 107 learned by the source domain SD can also be applied to the target domain TD.

(T1) The UDA inputs the source data xs in the source domain SD to the feature extractor 102, converts the source data xs into the feature fs, and outputs a predicted value of the ground truth to the label estimator 107. Since the ground truth of the classification is assigned to the source data xs, the UDA trains the label estimator 107, so that a ground truth can be predicted accurately for the source data xs.

(T2) By training the identifier 104 that identifies the source data xs and the target data xt, prediction accuracy of the inter-distribution distance estimation value d(ps, pt) is improved. Then, the UDA optimizes the feature extractor 102 so as to minimize the calculated inter-distribution distance estimation value d(ps, pt).

By simultaneously learning the two tasks of the task T1 (classification of the source domain SD) and the task T2 (minimization of the inter-distribution distance estimation value d(ps, pt)), the UDA can also apply the label estimator 107 trained only by the source domain SD to the target domain TD.

Partial Domain Adaptation

As shown in FIG. 1, UDA, which is a condition in which classes of the source domain SD and classes of the target domain TD are partially different from each other (specifically, a task in which the classes of the target domain TD are a part of the classes of the source domain SD, for example, as shown in FIG. 1, the source domain SD includes classes "1" to "4", and the target domain TD includes only classes "3" and "4"), is referred to as Partial Domain Adaptation (hereinafter, referred to as PDA).

In the PDA, in addition to the UDA, it is necessary to exclude the source data xs (xs1 and xs2 in this example) belonging to the class unique to the source domain SD from the source domain SD and select only the source data xs (xs3 and xs4 in this example) necessary for learning. Accordingly, the PDA executes a task that is harder than the UDA.

In the PDA, there is a method of optimizing the importance v, so that an inter-distribution distance estimation value d(ps (v), pt) when the source loss function ls is weighted by the importance v is minimized. When it is assumed that "the source data xs belonging to a class common to the target data xt further reduces the inter-distribution distance estimation value d(ps (v), pt)", the similarity ws is optimized so as to reduce the inter-distribution distance estimation value d(ps(v), pt), whereby the high importance v is assigned to the source data xs belonging to the common class.

Specifically, the PDA first trains the inter-distribution distance estimation value d(ps(v), pt), and when the identifier 104 and the calculation unit 106 can accurately estimate the inter-distribution distance estimation value d(ps(v), pt), the PDA repeats a procedure of selecting the source data xt that minimizes the inter-distribution distance estimation value d(ps (v), pt), thereby optimizing the importance v.

By training the identifier 104, the calculation unit 106 can estimate the inter-distribution distance estimation values of two domains, but the identifier 104 and the calculation unit 106 can estimate the inter-distribution distance estimation value only for the optimized distribution, and cannot estimate the inter-distribution distance estimation value for other distributions.

For example, it is assumed that the identifier 104 is optimized for the distributions ps and pt to become an identifier 104*s*. The identifier 104*s* can accurately estimate the inter-distribution distance estimation values d(ps (v), pt) of the distributions ps and pt, but when the distribution ps of the source domain SD is changed to another distribution (for example, pr), the identifier 104*s* and the calculation unit 106 cannot estimate an inter-distribution distance estimation value d(pr (v), pt). In order to obtain the inter-distribution distance estimation value d(pr (v), pt), it is necessary to optimize the identifier 104*s* again using data of the distributions pr and pt, and obtain a new identifier 104*r*.

Accordingly, in consideration of properties of the identifier 104, the identifier 104 is not optimal by performing data selection such as changing the distribution ps of the source domain SD to the distribution pr. That is, an operation of selecting the source data xs in the source domain SD by weighting the importance v is regarded as the same as changing the distribution ps of the source domain SD to the distribution pr.

In the PDA, source selection such as minimizing the inter-distribution distance estimation value d(ps (v), pt) estimated by the identifier 104*s* is learned, but even if the distribution ps of the source domain SD becomes the distribution pr such that the inter-distribution distance estimation value d(ps (v), pt) estimated by the identifier 104*s* is minimized, the inter-distribution distance estimation value d(pr (v), pt) calculated by the identifier 104*s* and the calculation unit 106 is not necessarily smaller than the inter-distribution distance estimation value d(ps (v), pt).

The learning device 100 shown in FIG. 1 selects the source data xs such that the inter-distribution distance estimation value d(pr (v), pt) after optimizing the identifier 104*s* is minimized after the distribution ps of the source domain SD is changed to the distribution pr. That is, the learning device 100 shown in FIG. 1 updates the identifier 104 each time the learning is performed (each time the inter-distribution distance estimation value d(p's, pt) is calculated), and learns the data selector 103 using the inter-distribution distance estimation value d(p's, pt) calculated after the update of the identifier 104 instead of selecting the source data xs.

Hereinafter, the learning performed by the learning device 100 when the number of updates of the identifier 104 is k (≤0) and a maximum value of the number of updates k is K will be specifically described with reference to FIGS. 3 to 5.

Learning Examples

FIG. 3 is a diagram showing a learning example 1 executed by the learning device 100. In the learning example 1, the maximum value K of the number of updates k is set to 1. In the case of FIG. 3, the identifier 104 subjected to a 0th update (k=0) is updated, and the identifier 104 after the update is used as the identifier 104 subjected to a 1st update (k=1). The data selector 103 is learned based on the inter-distribution distance estimation value d(p's, pt) calculated by the calculation unit 106 subjected to the 1st update.

The update of the identifier 104 from 0th to 1st is expressed by, for example, Formula (4) below. The update of the data selector 103 based on the inter-distribution distance estimation value d(p's, pt) calculated by the identifier 104 and the calculation unit 106 after the 1st update is expressed by, for example, the following Formula (5).

$$\theta_1^D = \theta_0^D - \alpha \nabla_{\theta_0^D} L^D(;\theta_0^D, \theta^s) \tag{4}$$

$$\theta^S \leftarrow \theta^S - \alpha \nabla_{\theta^S} d(;\theta^S, \theta_1^D(\theta^s)) \tag{5}$$

$\theta_k^D$ is a learning parameter of the identifier 104 after a k-th update (D means the identifier 104), and is an update loss for estimating the inter-distribution distance estimation value d(p's, pt). α is a constant. $\theta^S$ is a learning parameter of the data selector 103 (S means the data selector 103). $L^D$ is a loss function output from the identifier 104. $L^D$ is a loss function for accurately estimating the inter-distribution distance estimation value d(p's, pt), that is, the source loss function ls and the target loss function lt. When an index of the inter-distribution distance estimation value d(p's, pt) is the H-divergence, an input is a cross entropy loss when learning binary classification of the source data xs or the target data xt.

Figure 4:
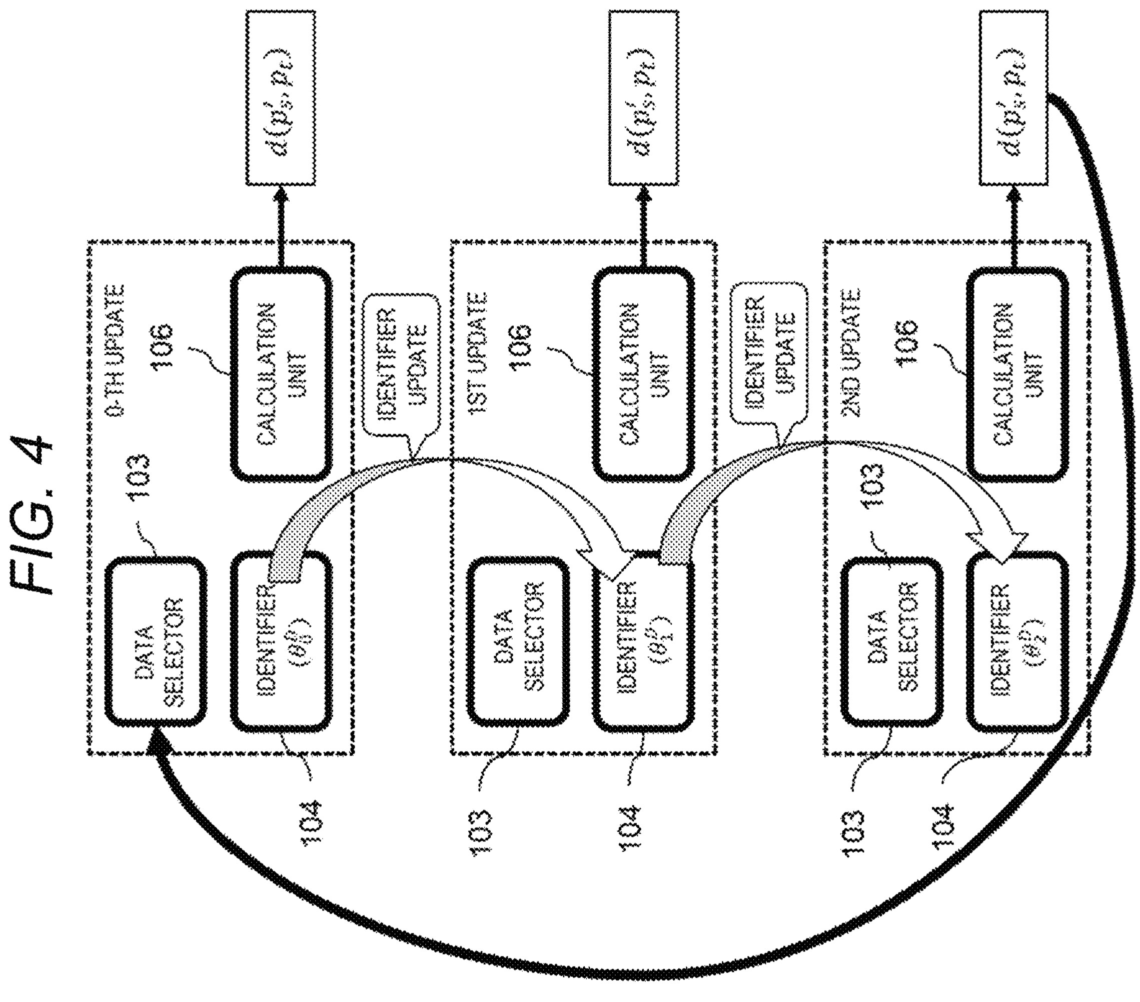
FIG. 4 is a diagram showing a learning example 2 executed by the learning device.

FIG. 4 is a diagram showing a learning example 2 executed by the learning device 100. In the learning example 2, the maximum value K of the number of updates k is set to 2. In the case of FIG. 4, the identifier 104 subjected to the 0th update (k=0) is updated, and the identifier 104 after the update is used as the identifier 104 subjected to the 1st update (k=1). In addition, the identifier 104 subjected to the 1st update (k=1) is updated, and the identifier 104 after the update is used as the identifier 104 subjected to a 2nd update (k=2).

The update of the identifier 104 from 0th to 1st is expressed by, for example, Formula (4) above. The update of the identifier 104 from 1st to 2nd is expressed by, for example, Formula (6) below. The update of the data selector 103 based on the inter-distribution distance estimation value d(p's, pt) calculated by the identifier 104 and the calculation unit 106 after the 2nd update is expressed by, for example, the following Formula (7).

$$\theta_2^D = \theta_1^D - \alpha \nabla_{\theta_1^D} L^D(;\theta_1^D(\theta^s), \theta^s) \tag{6}$$

$$\theta^S \leftarrow \theta^S - \alpha \nabla_{\theta^S} d(p_s', p_t;\theta^S, \theta_2^D(\theta^s)) \tag{7}$$

Figure 5:
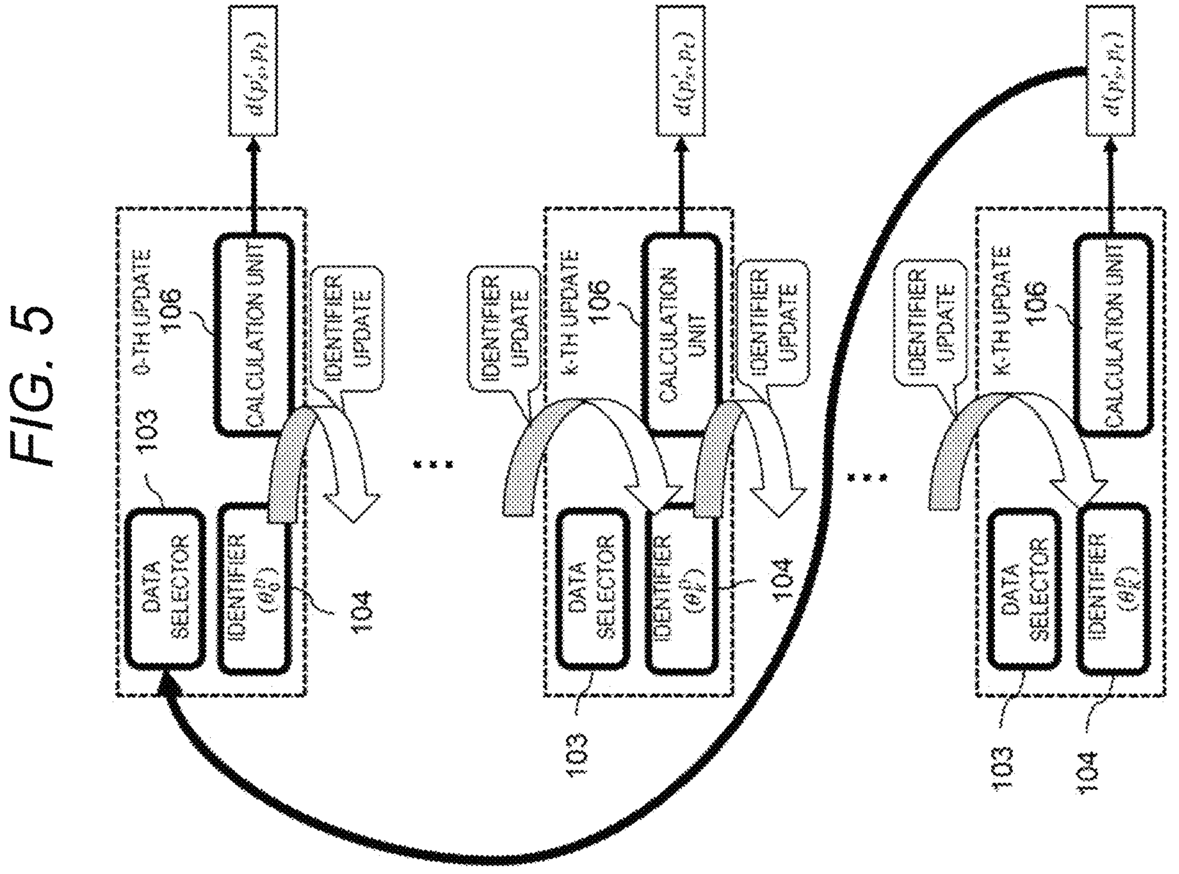
FIG. 5 is a diagram showing a learning example 3 executed by the learning device.

FIG. 5 is a diagram showing a learning example 3 executed by the learning device 100. The learning example 3 is an example (K≥1) in which the maximum value K of the number of updates k including FIGS. 3 and 4 is generalized. In the case of FIG. 5, the identifier 104 is updated until k becomes K, and the data selector 103 is trained based on the inter-distribution distance estimation value d(p's, pt) calculated by the calculation unit 106 subjected to a K-th update (k=K).

The update of the identifier 104 from 0th to 1st is expressed by, for example, Formula (4) above. The update of the identifier 104 from (k−1)th to k-th is expressed by, for example, Formula (8) below. The update of the data selector

103 based on the inter-distribution distance estimation value d(p's, pt) calculated by the identifier 104 and the calculation unit 106 after the K-th update is expressed by, for example, the following Formula (9).

$$\theta_k^D = \theta_{k-1}^D - \alpha \nabla_{\theta_1^D} L^D\left(; \theta_{k-1}^D(\theta^s), \theta^s\right) \quad (8)$$

$$\theta^S \leftarrow \theta^S - \alpha \nabla_{\theta^S} d\left(p_s', p_t; \theta^S, \theta_K^D(\theta^s)\right) \quad (9)$$

Figure 6:
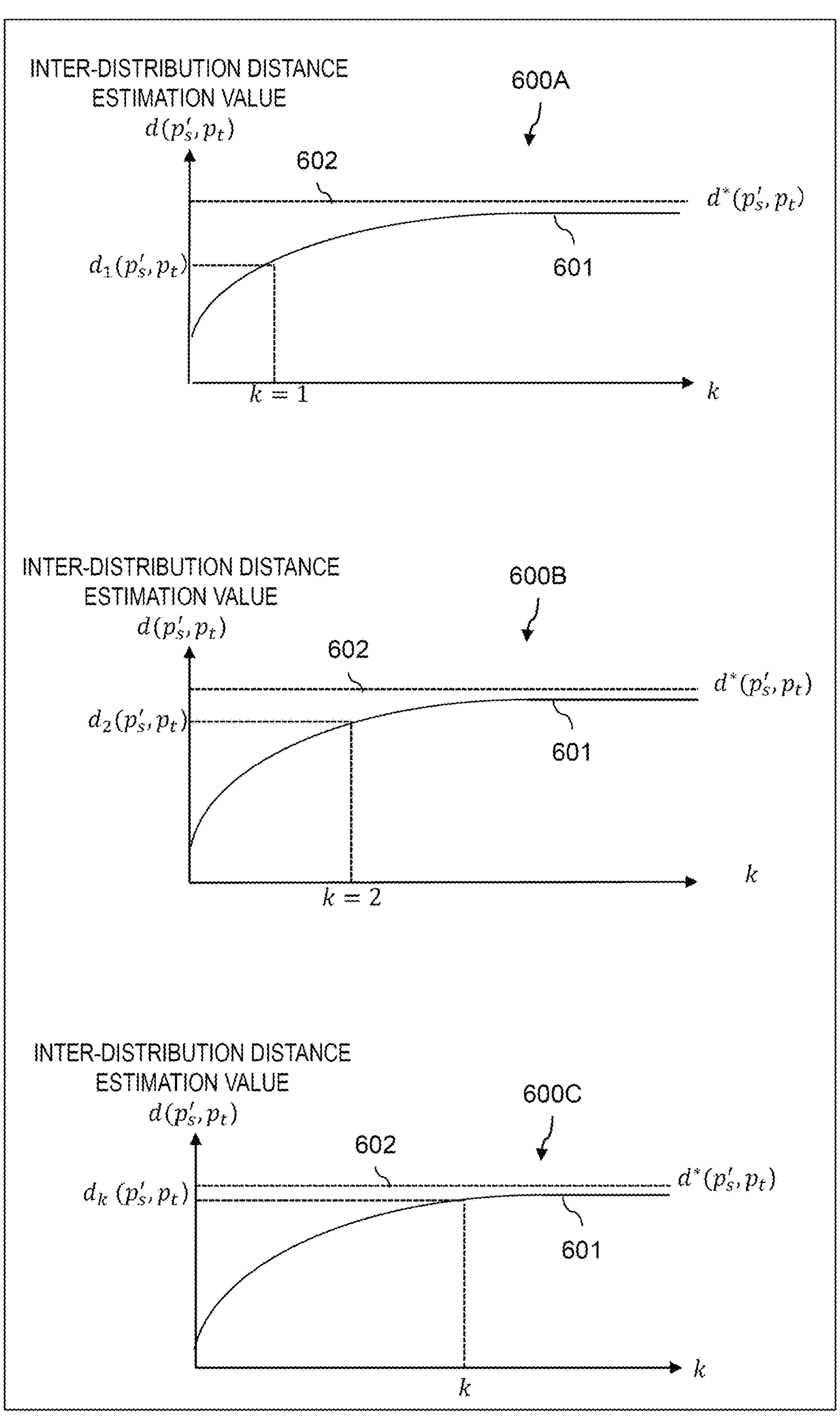
FIG. 6 is a graph showing a relationship between the number of updates and the inter-distribution distance estimation value.

FIG. 6 is a graph showing a relationship between the number of updates k and the inter-distribution distance estimation value d(p's, pt). (A) is a graph 600A corresponding to the learning example 1 of FIG. 3, (B) is a graph 600B corresponding to the learning example 2 of FIG. 4, and (C) is a graph 600C corresponding to the learning example 3 of FIG. 5. As described above, as the number of updates k increases, the inter-distribution distance estimation value d(p's, pt) increases in accuracy and gradually approaches an inter-distribution distance true value d*(p's, pt), and as the number of updates k decreases, a learning period is shortened.

The learning device 100 executes learning, by increasing or decreasing the number of updates k by the generation unit 108, to create the graph 600C, generates a function 601 of the inter-distribution distance estimation value d(p's, pt), and generates a gradual approach line 602 indicating the inter-distribution distance true value d*(p's, pt) based on the generated function 601.

The learning device 100 obtains the number of updates k (hereinafter, a convergence value of k* the number of updates k) by which the inter-distribution distance estimation value d(p's, pt) converges to the inter-distribution distance true value d*(p's, pt). For example, the learning device 100 sets the number of updates k at which a gradient of the function 601 is equal to or less than a predetermined value to the convergence value k* of the number of updates k, and executes learning. Accordingly, the learning device 100 can perform the learning using the convergence value k* of the number of updates k in the future, and can implement high accuracy of the inter-distribution distance estimation value d(p's, pt) and save a learning time.

Hardware Configuration Example of Learning Device 100

Figure 7:
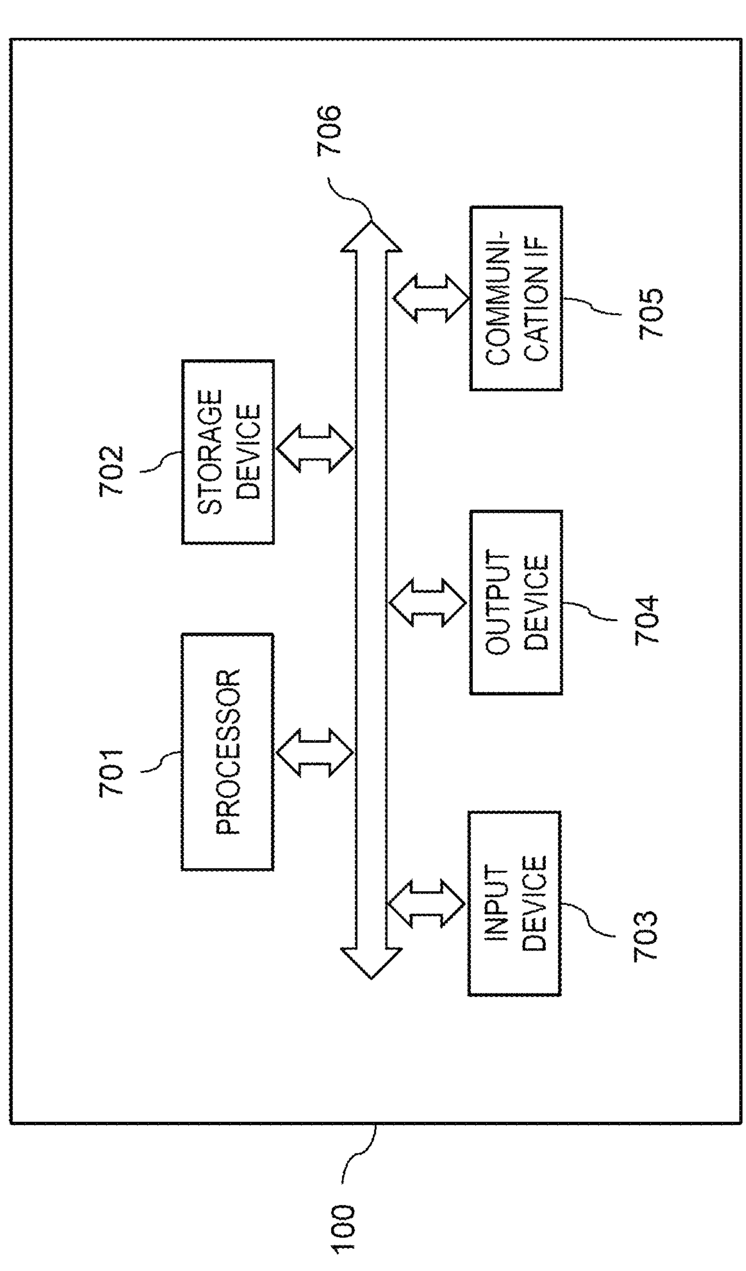
FIG. 7 is a block diagram showing a hardware configuration example of the learning device.

FIG. 7 is a block diagram showing a hardware configuration example of the learning device 100. The learning device 100 includes a processor 701, a storage device 702, an input device 703, an output device 704, and a communication interface (communication IF) 705. The processor 701, the storage device 702, the input device 703, the output device 704, and the communication IF 705 are connected by a bus 706. The processor 701 controls the learning device 100. The storage device 702 serves as a work area for the processor 701. The storage device 702 is a non-transitory or temporary recording medium which stores various types of programs and data. Examples of the storage device 702 include a read only memory (ROM), a random access memory (RAM), a hard disk drive (HDD), and a flash memory. The input device 703 inputs data. Examples of the input device 703 include a keyboard, a mouse, a touch panel, a numeric keypad, a scanner, a microphone, and a sensor. The output device 704 outputs data. Examples of the output device 704 include a display, a printer, and a speaker. The communication IF 705 is connected to a network, and transmits and receives data.

Specifically, the data extraction unit 101, the feature extractor 102, the data selector 103, the identifier 104, the adjustment unit 105, the calculation unit 106, the label estimator 107, and the generation unit 108 are implemented by, for example, executing a program stored in the storage device 702 shown in FIG. 7 by the processor 701. The storage unit 110 that stores the source domain SD and the target domain TD is implemented by the storage device 702.

Learning Processing Procedure

FIG. 8 is a flowchart showing an example of a learning processing procedure executed by the learning device 100. The learning device 100 sets the maximum value K of the number of updates k (step S801). The maximum value K of the number of updates k may be any numerical value input by a user operation, the convergence value k* of the number of updates k described above, or an upper limit value that can be set by the learning device 100.

Next, the learning device 100 sets the number of updates k to 0 (step S802). Then, the learning device 100 executes steps S803 to S807 for the source domain SD, executes steps S808 to S810 for the target domain TD, and proceeds to step S811.

First, in step S803, the learning device 100 extracts, by the data extraction unit 101, the source data xs from the source domain SD (step S803). The learning device 100 generates, by the feature extractor 102, the source feature fs for each piece of extracted source data xs (step S804). The learning device 100 inputs the source feature fs to the data selector 103 and calculates the similarity ws for each piece of extracted source data xs (step S805).

Next, the learning device 100 executes the identifier update (step S806). Specifically, for example, the learning device 100 inputs the source feature fs to the identifier 104, outputs a source identification result, calculates the source loss function ls using the source identification result and the ground truth of the extracted source data xs, and retrains the identifier 104.

Then, the learning device 100 weights, by the adjustment unit 105, the source loss function ls for each piece of extracted source data xs with the similarity ws (step S807), and proceeds to step S811.

In step S808, the learning device 100 extracts, by the data extraction unit 101, the target data xt from the target domain TD (step S808). The learning device 100 generates, by the feature extractor 102, the target feature ft for each piece of extracted target data xt (step S809).

Next, the learning device 100 executes the identifier update (step S810). Specifically, for example, the learning device 100 inputs the target feature ft to the identifier 104, outputs a target identification result, calculates the target loss function lt using the target identification result and the ground truth of the extracted target data xt, retrains the identifier 104, and proceeds to step S811.

Thereafter, the learning device 100 calculates, by the calculation unit 106, the inter-distribution distance estimation value d(p's, pt) (step S811). The learning device 100 determines whether k is equal to K (step S812), increments the number of updates k (step S813) when k is not equal to K (step S812: No), and returns to steps S803 and S808. On the other hand, when k is equal to K (step S812: Yes), the learning device 100 updates the data selector 103 by the data selector 103 using the inter-distribution distance estimation value d(p's, pt) calculated by the calculation unit 106 subjected to the K-th update (step S814). Then, the learning device 100 updates, by the generation unit 108, the distribution ps to the distribution p's, such that the inter-distribution distance from the distribution pt becomes the inter-distribution distance estimation value d(p's, pt) (step S815). As a result, the learning device 100 ends the learning processing.

In FIG. 8, when the number of updates k is less than K, the learning device 100 may not execute steps S804, S807, and S811. The learning device 100 may calculate the inter-distribution distance estimation value d(p's, pt) in step S811 at a timing when an instruction to end the learning processing is received from the outside, and update the data selector 103 (step S814). In this case, the learning device 100 may generate a graph 800C by the generation unit 108 and display the graph 800C on a display screen in order to support the timing of the instruction to end the learning processing from a user.

Learning and Estimation Processing Procedure of Label Estimator 107

Figure 9:
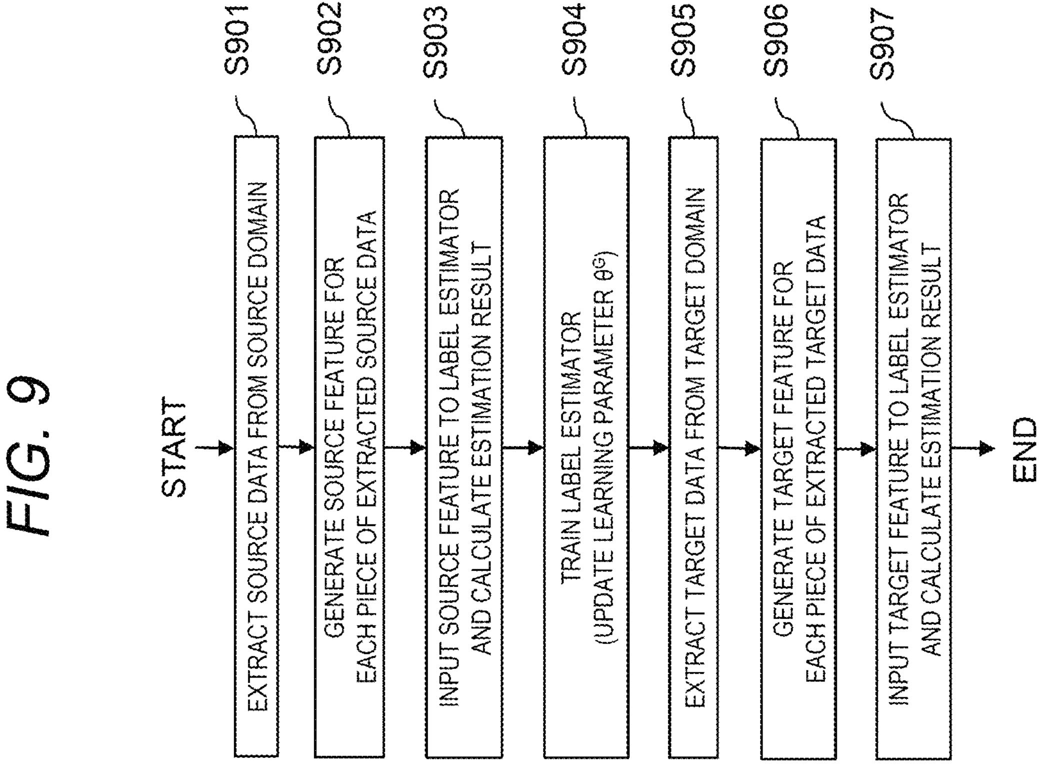
FIG. 9 is a flowchart showing an example of an estimation processing procedure executed by the learning device.

FIG. 9 is a flowchart showing an example of an estimation processing procedure executed by the learning device 100. The learning device 100 extracts, by the data extraction unit 101, the source data xs from the source domain SD updated (step S815) by the generation unit 108 (step S901). The learning device 100 generates, by the feature extractor 102, the source feature fs for each piece of extracted source data xs (step S902). The learning device 100 inputs the source feature fs to the label estimator 107 and calculates the estimation result group [cs] (step S903).

The learning device 100 trains the label estimator 107 based on a difference between the ground truth of the source data xs and the estimation result group [cs] (step S904).

Thereafter, the learning device 100 extracts, by the data extraction unit 101, the target data xt from the target domain TD (step S905). The learning device 100 generates, by the feature extractor 102, the target feature ft for each piece of extracted target data xt (step S906). The learning device 100 inputs the target feature ft to the label estimator 107 and calculates the estimation result group [ct] (step S907). In this manner, the ground truth of the target data xt is estimated with high accuracy. As a result, the learning device 100 ends the learning of the label estimator 107 and the estimation processing.

As described above, the learning device 100 can enable the transfer learning for the target domain TD that partially matches the classification of the source domain SD having the ground truth.

In the above-described examples, the learning device 100 extracts the source feature fs from the source data xs and extracts the target feature ft from the target data xt by the feature extractor 102, but the feature extractor 102 may not be provided. In this case, the learning device 100 may use the features of the source data xs and the target data xt as they are as the source feature fs and the target feature ft.

The invention is not limited to the above-described embodiments and includes various modifications and equivalent configurations within the spirit of the appended claims. For example, the above-mentioned embodiments are described in detail in order to make the invention easy to understand, and the invention is not necessarily limited to those including all the configurations described above. A part of the configurations of a certain embodiment may be replaced with a configuration of another embodiment. A configuration of another embodiment may be added to a configuration of a certain embodiment. A part of a configuration of each embodiment may be added to, deleted from, or replaced by another configuration.

Further, a part or all of the configurations, functions, processing units, processing methods described above and the like may be implemented by hardware, for example, by designing with an integrated circuit, or may be implemented by software, with a processor interpreting and executing a program that implements each function.

Information on a program, a table, a file and the like for implementing each function can be stored in a storage device such as a memory, a hard disk, and a solid state drive (SSD), or a recording medium such as an integrated circuit (IC) card, an SD card, and a digital versatile disc (DVD).

Control lines and information lines indicate what is considered necessary for description, and not all the control lines and the information lines are necessarily shown in a product. It can be considered that almost all components are actually interconnected.

What is claimed is:

1. A learning device comprising:

a processor configured to execute a program; and a storage device configured to store the program, wherein the storage device stores a first set in which a ground truth corresponding to one of a plurality of classes is assigned to each of a plurality of pieces of first data classified into the plurality of classes, and a second set having a plurality of pieces of second data subjected to classification into a smaller number of classes than the plurality of classes; and the processor executes:

identification processing of updating, when one of a feature of the first data and a feature of the second data is input, an identifier for identifying whether the data whose feature is input is the first data or the second data, based on a first loss function obtained as a result of the input of the feature of the first data and a second loss function obtained as a result of the input of the feature of the second data, by the number of updates;

data selection processing of calculating a similarity by a data selector that calculates the similarity, the similarity indicating how much the first data is similar to the second data when the feature of the first data is input at a last time of the number of updates;

adjustment processing of adjusting the first loss function obtained at the last time using the similarity calculated by the data selection processing;

calculation processing of calculating an estimated value of an inter-distribution distance between a first distribution of the plurality of pieces of first data and a second distribution of the plurality of pieces of second data based on the first loss function after the adjustment performed by the adjustment processing and the second loss function;

data selector update processing of updating the data selector based on the estimated value calculated by the calculation processing; and distribution update processing of updating the first distribution based on the estimated value.

2. The learning device according to claim 1, wherein the processor executes setting processing of setting the number of updates.

3. The learning device according to claim 1, wherein in the data selection processing, the processor calculates the similarity at a time when an end instruction is received from an outside.

4. The learning device according to claim 1, wherein the processor executes:

the data selection processing, the adjustment processing, and the calculation processing at each of the number of updates; and generation processing of generating information indicating a change in the estimated value in accordance with an increase or decrease in the number of updates, based on the estimated values calculated in the respective updates.

5. The learning device according to claim 4, wherein in the generation processing, the processor updates the number of updates based on the information indicating the change in the estimated value.

6. The learning device according to claim 1, wherein the processor executes:

first estimation processing of estimating, when data is input, the ground truth suitable for the first data in the first distribution subjected to update by the distribution update processing by inputting the first data in the first distribution subjected to the update to a label estimator that estimates the ground truth suitable for the data; and training processing of training the label estimator based on the ground truth assigned to the first data and a first estimation result obtained by the first estimation processing.

7. The learning device according to claim 6, wherein the processor executes second estimation processing of estimating the ground truth suitable for the second data by inputting the second data to the label estimator trained by the training processing.

8. A learning method executed by a learning device, the learning device including a processor configured to execute a program and a storage device configured to store the program, wherein the storage device stores a first set in which a ground truth corresponding to one of a plurality of classes is assigned to each of a plurality of pieces of first data classified into the plurality of classes, and a second set having a plurality of pieces of second data subjected to classification into a smaller number of classes than the plurality of classes; and the processor executes:

identification processing of updating, when one of a feature of the first data and a feature of the second data is input, an identifier for identifying whether the data whose feature is input is the first data or the second data, based on a first loss function obtained as a result of the input of the feature of the first data and a second loss function obtained as a result of the input of the feature of the second data, by the number of updates;

data selection processing of calculating a similarity by a data selector that calculates the similarity, the similarity indicating how much the first data is similar to the second data when the feature of the first data is input at a last time of the number of updates;

adjustment processing of adjusting the first loss function obtained at the last time using the similarity calculated by the data selection processing;

calculation processing of calculating an estimated value of an inter-distribution distance between a first distribution of the plurality of pieces of first data and a second distribution of the plurality of pieces of second data based on the first loss function after the adjustment performed by the adjustment processing and the second loss function;

data selector update processing of updating the data selector based on the estimated value calculated by the calculation processing; and distribution update processing of updating the first distribution based on the estimated value.

9. A non-transitory computer readable storage medium storing a computer executable program that when executed by a processor accessible to a storage device, the storage device storing a first set in which a ground truth corresponding to one of a plurality of classes is assigned to each of a plurality of pieces of first data classified into the plurality of classes, and a second set having a plurality of pieces of second data subjected to classification into a smaller number of classes than the plurality of classes, causes the processor to execute:

identification processing of updating, when one of a feature of the first data and a feature of the second data is input, an identifier for identifying whether the data whose feature is input is the first data or the second data, based on a first loss function obtained as a result of the input of the feature of the first data and a second loss function obtained as a result of the input of the feature of the second data, by the number of updates;

data selection processing of calculating a similarity by a data selector that calculates the similarity, the similarity indicating how much the first data is similar to the second data when the feature of the first data is input at a last time of the number of updates;

adjustment processing of adjusting the first loss function obtained at the last time using the similarity calculated by the data selection processing;

calculation processing of calculating an estimated value of an inter-distribution distance between a first distribution of the plurality of pieces of first data and a second distribution of the plurality of pieces of second data based on the first loss function after the adjustment performed by the adjustment processing and the second loss function;

data selector update processing of updating the data selector based on the estimated value calculated by the calculation processing; and distribution update processing of updating the first distribution based on the estimated value.

* * * * *